INVENTOR
LAWRENCE B. SPERRY.

L. B. SPERRY.
AERIAL TORPEDO.
APPLICATION FILED DEC. 22, 1916.

1,418,605.

Patented June 6, 1922.
3 SHEETS—SHEET 2.

INVENTOR
LAWRENCE B SPERRY
BY
Herbert H. Thompson,
ATTORNEY.

L. B. SPERRY.
AERIAL TORPEDO.
APPLICATION FILED DEC. 22, 1916.

1,418,605.

Patented June 6, 1922.
3 SHEETS—SHEET 3.

INVENTOR
LAWRENCE B. SPERRY.
BY
Herbert H. Thompson,
ATTORNEY.

UNITED STATES PATENT OFFICE.

LAWRENCE BURST SPERRY, OF BROOKLYN, NEW YORK, ASSIGNOR TO THE SPERRY GYROSCOPE COMPANY, OF BROOKLYN, NEW YORK, A CORPORATION OF NEW YORK.

AERIAL TORPEDO.

1,418,605.  Specification of Letters Patent.  Patented June 6, 1922.

Application filed December 22, 1916. Serial No. 138,485.

*To all whom it may concern:*

Be it known that I, LAWRENCE B. SPERRY, a citizen of the United States of America, residing at 1505 Albemarle Road, Brooklyn, in the county of Kings and State of New York, have invented certain new and useful Improvements in Aerial Torpedoes, of which the following is a specification.

This invention relates to means whereby all of the controls of an aeroplane, dirigible balloon or the like are rendered entirely automatic whereby an operative automobile aerial torpedo may be produced. In carrying out my invention I employ an automatic device for steering the aircraft in azimuth which is preferably of a gyroscopic nature, a means for maintaining the lateral and longitudinal stability of the craft if the type of craft used is not inherently stable, means for governing the height at which the craft flies and means for discharging either directly or indirectly the explosive charge at a predetermined point in the flight of the torpedo.

Figure 1:
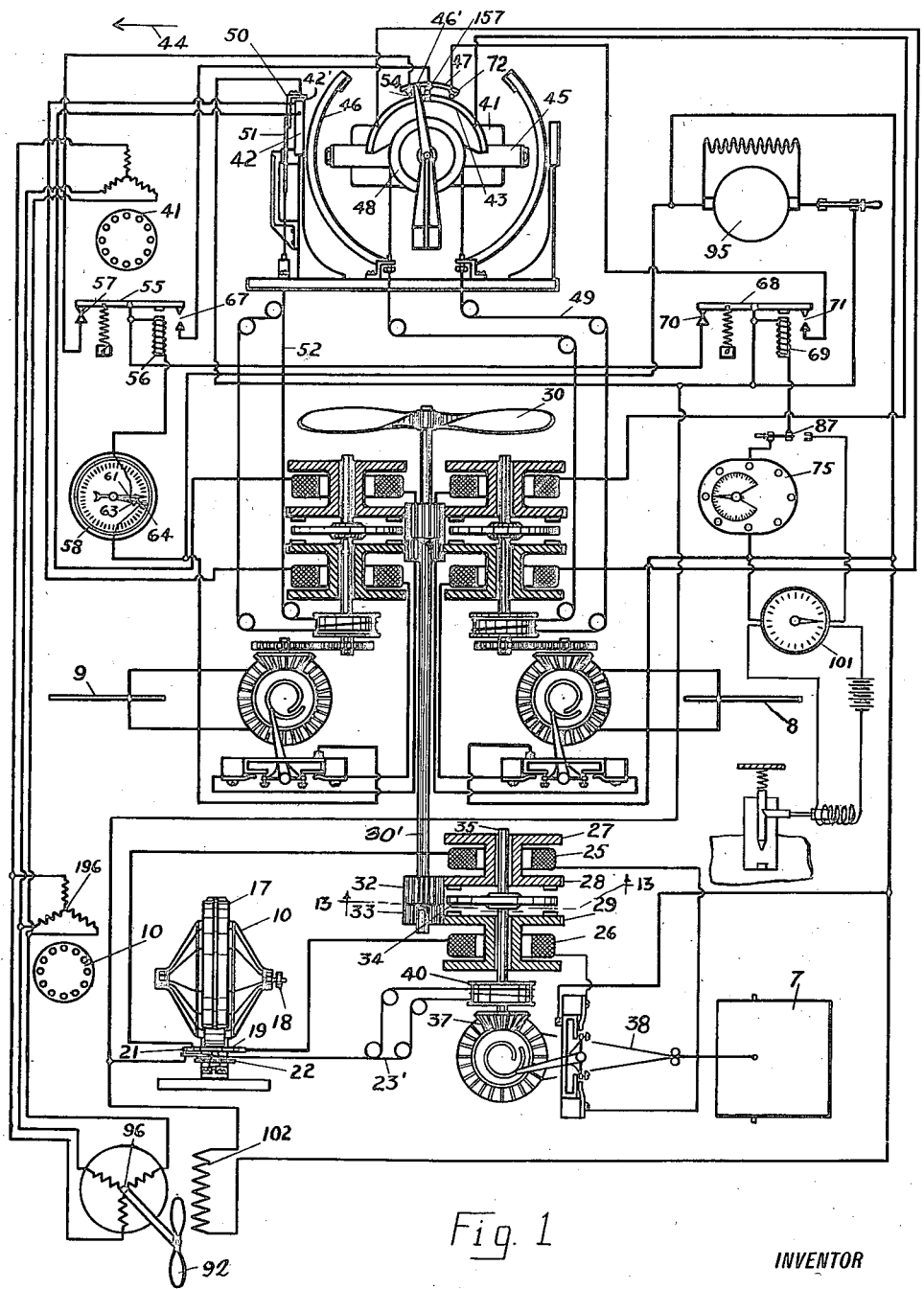
Figure 2:
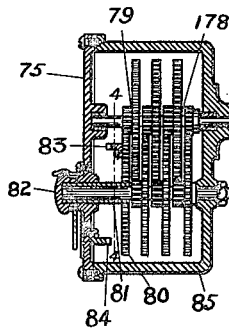
Figure 3:
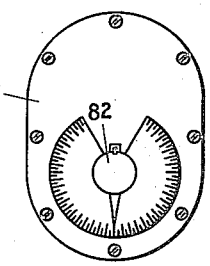
Figure 4:
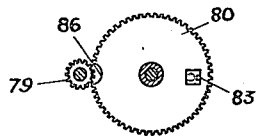
Figure 5:
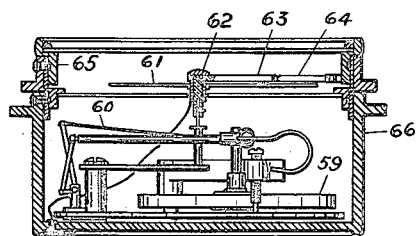
Figure 6:
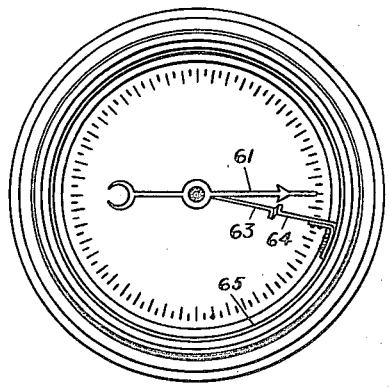
Figure 7:
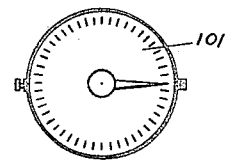
Figure 8:
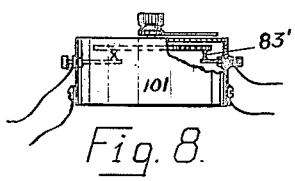
Figure 9:
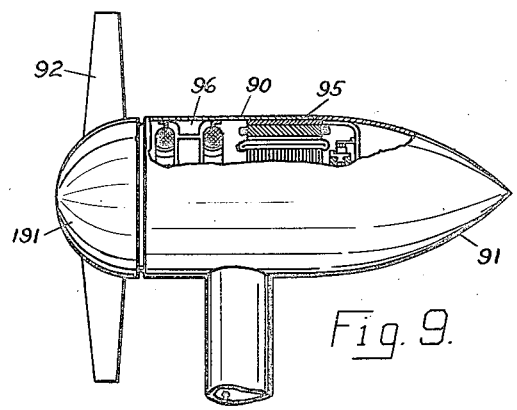
Figure 10:
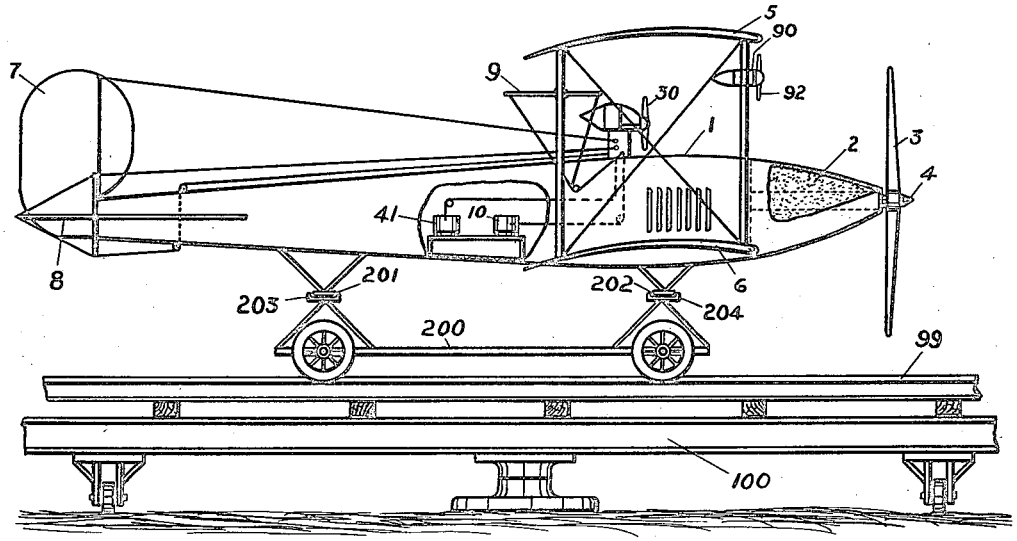
Figure 12:
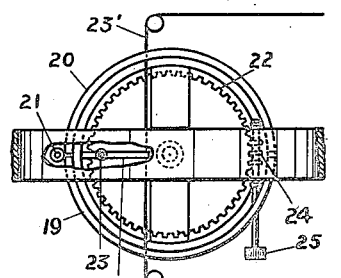
Figure 11:
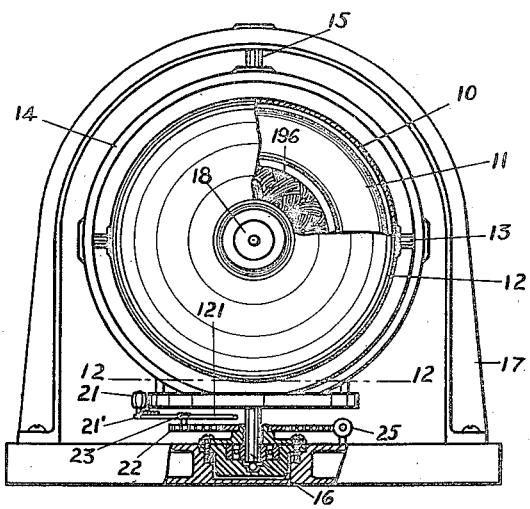
Figure 13:
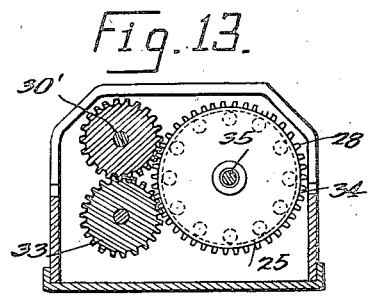

Referring to the drawings in which what I now consider to be the preferred form of my invention are shown: Fig. 1 is a diagrammatic view illustrating the various controls employed. Fig. 2 is a detail section of an instrument termed a "revolution counter" which controls the point at which the explosive is discharged. Fig. 3 is an end view of the same. Fig. 4 is a section of the gears of Fig. 2 on line 4—4. Fig. 5 is a vertical section of the instrument used to govern the height at which the torpedo flies. Fig. 6 is a plan view of the same. Fig. 7 is a plan view of a modified form of the instrument for controlling the point at which the explosive is discharged. In this instance the instrument is in the form of a chronometer. Fig. 8 is an elevation of the same, partly broken away. Fig. 9 is a side elevation partly in section of the preferred form of generator for supplying current to operate the various controls. Fig. 10 is a diagrammatic side elevation of a torpedo mounted on a launching track. Fig. 11 is an end elevation partly in section of the gyroscope used to control the steering. Fig. 12 is a section on line 12—12 Fig. 11. Fig. 13 is a section on line 13—13 of Fig. 1.

My invention is shown as applied to the aeroplane type of aircraft. It may be of any desired construction although of course as no passengers are carried it may be much smaller than the ordinary passenger aeroplane. It may be either of the inherently stable or of the neutral-stable type. If of the former type, or if a dirigible balloon is employed, the stabilizing devices hereinafter described need not be employed.

The aeroplane is shown in Fig. 10 as consisting of a body portion 1 on the forward portion of which is mounted an explosive charge 2 and the propeller 3. A cap 4 may be used to ignite the explosive on striking an object.

The main supporting planes of the aeroplane are shown at 5 and 6 while the vertical rudder, horizontal rudder and ailerons are shown at 7, 8 and 9 respectively. The torpedo may be driven from any source of power such as an internal combustion engine (not shown) mounted within the body 1.

One of the most important elements in securing a successful torpedo of this character is a steering device which will unfailingly keep the aeroplane on the course upon which it was originally set. To provide such a means I prefer to employ a gyroscope 10 (see Figs. 1, 10, and 11). Said gyroscope preferably comprises an electrically driven rotor 11, journalled within a rotor bearing frame or casing 12 which in turn is mounted for oscillation about horizontal axis 13 within a vertical ring 14. The said ring in turn is swiveled about a vertical axis on pivots 15—16 within framework 17. The gyroscope is preferably non-pendulous or perfectly balanced and is, as will be seen, provided with three degrees of freedom. It may be provided with an adjustable weight 18 if desired to compensate for variations in latitude.

The steering mechanism is controlled by variations which take place in the angular position of the gyroscope and aeroplane. For this purpose electrical contacts 19—20 may be secured to the vertical ring 14 while a cooperating trolley or brush 21 is mounted on some relatively fixed portion of the aeroplane. Preferably the said trolley is mounted on a rotatable worm gear 22 or the like which is adapted to be set so as to move the trolley to various portions with respect to the gyroscope for purposes hereinafter described. The worm wheel 22 may be set by means of worm 24 and knob 25. Trolley 21 is preferably pivotally mounted at 21' on a lever 121 which in turn is mounted on gear 22 on pivot 23 so that the trolley may be moved with reference to the gear by means of connecting members or wires 23', forming a follow-up connection from the steering mechanism. Said contact and trolley are in circuit with coils 25—26 on a servo motor 27. The servo motor is shown as comprising gears 28 and 29 which are continuously driven in opposite directions from a wind mill or fan 30 on shaft 30' by means of inter-meshing pinions 32, 33. A clutch disc 34 mounted upon shaft 35 is positioned between said gears 28, 29, the gears being provided with clutch faces with which the disc is adapted to engage. As either magnet 25—26 is excited the corresponding gear will be thrown against the discs 34 and the shaft 35 revolved to actuate the vertical rudder 7 through bevel gears 37 and connecting wires 38. From the drum 40 follow-up wires 23' above referred to lead back to the trolley 21.

As the details of the preferred form of my servo motor, for this and similar uses, are set forth fully in my co-pending application No. 87,434 for automatic pilots for aeroplanes, filed March 29, 1916, further elaboration of the exact construction of the servo motor need not be presented here.

For controlling both the longitudinal and lateral stability I prefer to employ one or more gyroscopes 41 of the type set forth in the above mentioned application. As there explained the gyroscopic unit comprises a pendulous gyroscope mounted on a vertical spinning axis and controlling both the longitudinal and lateral controls by two sets of contacts 42—43 positioned so as to be moved by the relative movement of the gyroscope about either axis. The contacts 43 which with the aeroplane flying in the direction of the arrow 44 would govern the longitudinal stability are shown as mounted on the horizontal gimbal ring 45 while the contacts 42 are secured to a swinging loop 46 connected to the gyroscope so as to receive motion about the longitudinal axis.

As is the case with the steering gyroscope I prefer to provide the cooperating brushes with a follow-up system. For this purpose the arm 46' which supports the plurality of brushes 47 is shown as pivotally mounted and secured to a pulley 48 around which the follow-up wires 49 from the horizontal rudder 8 extend. Similarly bush 42' is connected to a pulley 51 over which follow-up wires 52 are placed leading from the ailerons 9. The brush 54 is normally in circuit and is so positioned as to cause the machine to climb rapidly. Means are provided to shift the effective position of the brushes as soon as the aeroplane rises to or above the predetermined height. For this purpose I place in circuit with brush 54 a relay 55 which, when operating magnet 56 is excited, breaks the circuit of brush 54 at point 57 and places the second brush 157 in circuit. The latter brush may be located so as to cause the machine to be positioned in a substantially horizontal position or in other words, so that it will descend slightly while flying, or at least not rise. Magnet 56 is operated by means of barometric device 58 which may assume the form shown in Figs. 5 and 6. This device comprises an aneroid barometer, comprising the usual expansion chamber 59 multiplying mechanism 60 and index 61. On the said barometer and preferably attached to the index stem 62 is a contact member 63 adapted to come into contact with a second member 64 when a predetermined altitude is reached or exceeded. Preferably member 64 is made adjustable so that the instrument may be set for flying at different heights. For this purpose it may be secured to a ring 65 rotatably mounted on the top of the casing 66 of the barometer.

It will be seen that the excitation of magnet 56 will close contacts 67 and throw brush 54 out of circuit and place brush 157 in circuit. In series with said relay is preferably placed a second relay 68, having contacts 70 and 71. When the relay is in normal position as shown the two brushes 54 and 157 are operated as above described. But when the operating magnet 69 is excited contact 70 will be broken and contact 71 made, which will place a third brush 72 in the circuit and throw out both of the other brushes. Brush 72 is set for a steep and rapid descent of the aeroplane and is only designed to be thrown in circuit when the aeroplane has reached a point near the target at which it was originally aimed.

The problem to be solved in devising a successful aerial torpedo will be seen to be somewhat different from an under-water torpedo, as in the latter type the torpedo is usually fired merely by contact without any reference to how far or how long it has traveled before striking the object. In the air, on the other hand, it is usually necessary to fly the torpedo at a much greater height than the object at which it is aimed extends so that it would never strike the object unless means are provided to alter its course or elevation when it nears the object.

To excite the said magnet 69 any means for indicating or measuring distance may be employed. In one form of the invention I have shown a revolution counter 75 designed to be driven from the propeller shaft 76 (see Fig. 2). Such a counter will indicate with comparative exactness the distance through the air or medium through which the torpedo is driven and since the air currents are of relatively slow velocity compared with the speed of the aeroplane, such indicator will designate the approximate distance traveled. The exactness of this indication, of course, may be increased by noting the direction and the velocity of air currents before launching the torpedo and making due allowance therefor in the setting of the counter. Said counter is rotated through gears 77 and flexible shaft 78. The counter comprises preferably a plurality of multiple reduction gears 178 designed to produce an extremely slow rotation of the last pinion 79. The last large gear 80 is mounted on a slidable sleeve 81 so that it may be withdrawn from engagement with the said pinion by pulling out knob 82. While said gear is disengaged it may be set to any desired relation with the pinion 79. Gear 80 is provided with a contact 83 adapted to engage a fixed contact 84 on the casing 85 or other part of the revolution counter. A notch 86 may be provided in said gear so that the pinion 79 will run into it and the gear 80 be stopped when the contacts 83 and 84 are engaged. By this or a similar method I provide means for making sure that the aeroplane will continue to descend when the descent is once started. Contacts 83 and 84 are of course, in circuit with magnet 69. Instead of employing a revolution counter or the like I may employ a chronometer 101 for indicating distance. As the normal speed of the aeroplane is known, a chronometer may be used to advantage for this purpose. The chronometer is provided with contacts 83' adapted to be operated after a predetermined period of time has elapsed, in a manner similar to that described in the revolution counter. I may provide a switch 87 on the aeroplane so that either the revolution counter or the chronometer may be used at will.

As above stated, I prefer to drive the servo motor by a windmill 30. I also prefer to generate the electricity necessary for operating the various controls above described by a wind driven fan. A desirable form of dynamo electric machine is shown in Fig. 9 and consists of a tubular body portion 90 having a tapering stream line tail 91. The forward portion is closed by the enlarged hub 191 of the turbine blades 92.

Preferably the said machine is designed to furnish both alternating and direct current. As shown, two separate generators are provided for this purpose, the direct current generator being indicated at 95 and the alternating current machine at 96. The direct current machine is employed to actuate the servo motor and operate all other devices in the torpedo for which such current is suitable, while the A. C. generator is used for driving the stabilizing and steering gyroscopes (see Fig. 1). The field 102 of the A. C. generator may be excited from the D. C. machine. The alternating current apparatus is shown as a three phase type, the generator being an inductor alternator while the gyro motors are three phase induction motors; the rotor 11 forming the gyro wheel while all the windings are placed on the stator 196.

As I find it desirable to have both gyroscopes in full operation before the torpedo takes the air, I prefer to place the generator 90 in the stream line of the propeller 3, so that the wind caused by the propeller as soon as the engine is started will quickly bring the generator up to speed. The servo-motor, also, may be similarly positioned.

The operation of my invention is as follows:

The torpedo is preferably launched from a track 99 or the like so that the direction in which it takes the air will be known. If desired the track may be mounted on a turntable 100 so that the torpedo can be fired in any desired direction. The torpedo body may be made without wheels and a launching carriage 200 provided upon which the torpedo rests. Blocks 201 and 202 are attached to the torpedo body and rest in shallow pockets 203, 204, on carriage 200. When the torpedo starts to move forward it takes the carriage with it, but as soon as it starts to rise it leaves the carriage on the track. If such a turntable is not provided or circumstances are such that the torpedo cannot be launched in the direction in which it is desired to fly, for instance, if it is found desirable to always launch the torpedo into the wind, I may make use of the knob 25 above referred to which shifts the position of the trolley 21 with respect to the gyroscope. It will readily be seen that if it is desired that the torpedo should fly on a course at right angles to the launching track all that is necessary is to set the trolley at 90° to the line of the track or to the fore and aft line of the aeroplane. Upon being launched, therefore, the trolley 21 and the contacts 19—20 on which it is placed will operate the rudder 7 and turn the aeroplane until it brings the trolley back to the insulated section between the contacts.

Upon taking the air the torpedo will rise rapidly since as shown in Fig. 1 contact 54 is normally in circuit with the servo motor. As soon, however, as the torpedo reaches the desired height the aneroid barometer contact will operate the relay to throw brush 157 in circuit and thereby cause the aeroplane to slightly descend. This will continue until the barometer contact is again broken and the plane will rise again. The flight will continue until the predetermined distance has been traveled, or in other words, until the revolution counter or the chronometer compels the contact to operate relay 68 whereupon brush 72 be thrown in circuit and the aeroplane caused to descend sharply. As soon as it strikes an object the charge will be exploded by contact or by a time fuse in the usual manner. A time fuse, if used, might be connected to chronometer 101 so as to be exploded at a predetermined interval of time after the torpedo is set to the descending position. To this end the solenoid 151 is placed in circuit with a second contact 152 on the chronometer 101 (Fig. 7). Said solenoid serves to withdraw catch 153 thereby releasing trigger 154 to fire the cap 150 and charge 2.

In accordance with the provisions of the patent statutes, I have herein described the principle of operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In an aerial torpedo, the combination with longitudinal control means, of a gyroscope for normally maintaining said means in an ascending position, a barometric device and means brought into operation by said device and acting through said gyroscope for setting said control means to a substantially horizontal position.

2. In an aerial torpedo, the combination, with longitudinal control means, of a pendulous device for normally controlling said means, a barometric device, and means connecting said barometric pendulous devices whereby the former alters the effective relation between the latter and the control means without disturbing the former and a follow-up connection between the gyroscope and said control means.

3. In an aerial torpedo the combination with longitudinal and vertical control rudders of a gyroscope for normally controlling said longitudinal rudder, a gyroscope for controlling said vertical rudder, a source of power for continuously spinning said gyroscope and a barometric device also effecting said longitudinal rudder.

4. In an aerial torpedo the combination with longitudinal control means, of a pendulous device for normally controlling said means, and a distance responsive device also affecting said means.

5. In an aerial torpedo, the combination, with a longitudinal control member of a pendulous device for normally controlling said member, a distance responsive device and means connecting said devices whereby the former alters the effective relation between the latter and the control member.

6. In an aerial torpedo, the combination with longitudinal and vertical control rudders, of a pendulous device and a distance responsive device for normally controlling said longitudinal rudder, a gyroscope for controlling said vertical rudder and a barometric device also affecting said longitudinal rudder.

7. In an aerial torpedo, the combination with a longitudinal control member, of a barometric device for normally controlling said member, and a distance responsive device for turning said member to a new position.

8. In an automobile dirigible device, means for steering it through its enveloping medium at a predetermined altitude, a distance responsive device, and means for altering the altitude of flight actuated by said device.

9. In an aerial torpedo, in combination, an electro-motor stabilizing gyroscope, an electro-motor steering gyroscope, a servo-motor electrically controlled from said gyroscopes, and a dynamo electric machine for driving said gyroscopes and exciting the servo-motor, said machine being wind driven.

10. In an aerial torpedo, the combination with the explosive charge, of an aeroplane structure for carrying the charge, means for causing said torpedo to fly at a predetermined height, means for causing the same to maintain its course, and distance responsive means for causing descent and detonation of said charge.

11. In an aerial torpedo, the combination with a pendulous device, of a longitudinal control means, a barometric device for normally controlling said means through said pendulous device, and a distance responsive device for causing detonation of said torpedo.

12. In an aerial torpedo, the combination with a rudder and a device adapted to maintain a predetermined position in azimuth, of a two part means responsive to relative turning of the torpedo and device for controlling the rudder, a follow-up connection between the rudder and said device, and means whereby the relative position of said means may be varied to cause the torpedo to change its course.

13. An aerial torpedo, including longitudinal, lateral and azimuth control means, a plurality of electrically driven gyroscopes, a wind driven generator for said gyroscopes, and a servo-motor connected to said means and actuated electrically from said generator by said gyroscopes for controlling said means.

14. In an aerial torpedo, the combination with a longitudinal control means, of a barometric device for normally controlling said means, and a distance responsive device also affecting said means.

15. In an aerial torpedo, the combination with a longitudinal control member, of a gyroscopic device, means on said device and on an adjacent part of the aeroplane for operating said member, a barometric device, and means brought into operation by said barometric device for shifting the effective relation between said two means without disturbing the gyroscopic device.

16. In an aerial torpedo the combination with a longitudinal control member, of a gyroscope, means on said gyroscope and on an adjacent part of the aeroplane for operating said member, a distance responsive device, and means brought into operation by said device for shifting the effective relation between said two means.

17. In an aerial torpedo the combination with a longitudinal control member, of a gyroscopic pendulum, means on said pendulum and on an adjacent part of the aeroplane for operating said member, a barometric device, a distance responsive device, and means responsive to each of said devices for shifting the effective relation between said two means.

18. In an aerial torpedo, the combination with an explosive charge and longitudinal control means, of a means responsive to the happening of a predetermined event for causing said control means to cause the descent of the torpedo, and means for detonating said charge at a predetermined interval after said descent is caused.

19. In an aerial torpedo, the combination with a longitudinal control means, of a pendulous device for normally controlling said means, a barometric device affecting said means, and a distance responsive element also affecting said means.

20. In an aerial torpedo, the combination with longitudinal and azimuth control members, of a pendulous device and a device adapted to maintain a predetermined position in azimuth, alterable governing means operable between said members and said devices, respectively, and means for altering said means whereby in launching said torpedo will both ascend and turn in azimuth before reaching its final course.

21. In an aeroplane, the combination with longitudinal control means, of a gyroscope, an altitude responsive device, alterable means operable by a relative inclination of the aeroplane and gyroscope for governing said control means and means controlled by said device for shifting the effective relation between said other two means whereby said control means causes ascent of the aeroplane to a predetermined height and substantially horizontal flight at that height.

22. In an aerial torpedo, the combination with an explosive charge and longitudinal control means, of means for causing said control means to cause the descent of the torpedo at a predetermined point in the flight of the torpedo, and means adapted to detonate said charge at a predetermined point in its descent.

23. In an aerial torpedo, the combination with a longitudinal control plane, of means responsive to the height of the torpedo for normally controlling said plane, and an auxiliary element adapted to be brought into action at a predetermined point in the flight of the torpedo for causing said control plane to move to a descending position.

24. In an aerial torpedo, the combination with a launching runway adapted to be set in any desired direction, of a direction maintaining device on the torpedo, means responsive to a change in the relative positions of said device and torpedo for steering the same and means permitting the altering of the relations of said means whereby the torpedo may be set to any desired course irrespective of the direction of launching.

25. In an aerial torpedo, the combination with a pendulous device, of a longitudinal control means, a barometric device for normally controlling said means through said pendulous device, and a distance responsive device also affecting said means.

26. In an aerial torpedo, the combination with a pendulous device, of a longitudinal control means, a barometric device for normally controlling said means through said pendulous device, and a distance responsive device also affecting said means through said pendulous device.

27. In an aerial torpedo, comprising a body adapted to contain an explosive charge, propelling means for said body, an elevating plane for said body, automatic means for governing the position of the same, means responsive to the distance of travel of said body, and means operated by said last named means for changing the normal position of said elevating plane.

28. In an aerial torpedo, a body adapted to contain an explosive charge, propelling means and controlling surfaces therefor, means for normally maintaining said surfaces in a predetermined position, and means responsive to the happening of a predetermined event and having connection with said surfaces and charge for causing descent of the torpedo and exploding said charge.

29. In an aerial torpedo, a body adapted to contain an explosive charge, propelling means and controlling surfaces therefor, means for normally maintaining said surfaces in a predetermined position, and time means having a connection with said surfaces and charge for first causing descent of the torpedo and then exploding said charge.

30. An aerial torpedo comprising an elevator, a plurality of control elements one of which is gyroscopically stabilized for controlling said elevator, and means responsive to the height of said torpedo for altering the operative relation between the stabilized and other control elements.

31. An aerial torpedo comprising an elevator, a plurality of control elements one of which is gyroscopically stabilized for controlling said elevator, a follow-up connection between the elevator and control elements, and means responsive to the height of said torpedo for altering the operative relation between the stabilized and other control elements.

32. In a torpedo, a plurality of relatively movable control elements, a rudder controlled thereby, means for stabilizing one of said elements, a barometric device connected with one of said elements to alter the effective relation between the two elements and a follow-up connection between the rudder and one of said elements.

33. In an aerial torpedo, the combination with horizontal control means, of a gyroscope for normally controlling said means, and a distance responsive device also affecting said means.

34. In a aerial torpedo, the combination with longitudinal and vertical control rudders, of a gyroscope, a distance responsive device and a barometric device all of which cooperate to control said rudders substantially as described.

35. In an aerial torpedo, the combination with longitudinal and vertical control rudders, of a gyroscope, a distance responsive device, a barometric device, all cooperating to control said rudders, and a follow up connection between the rudders and the controls.

In testimony whereof I have affixed my signature.

LAWRENCE BURST SPERRY.